United States Patent
Thoreau et al.

(10) Patent No.: US 9,374,597 B2
(45) Date of Patent: Jun. 21, 2016

(54) INTER-IMAGE PREDICTION METHOD AND DEVICE AND CORRESPONDING ENCODING METHOD AND DEVICE

(71) Applicant: THOMSON LICENSING, Issy de Moulineaux (FR)

(72) Inventors: Dominique Thoreau, Cesson Sevigne (FR); Safa Cherigui, Villeurbannes (FR); Alain Martin, Rennes (FR); Philippe Guillotel, Vern sur Seiche (FR); Christine Guillemot, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/431,292

(22) PCT Filed: Sep. 25, 2013

(86) PCT No.: PCT/EP2013/069903
§ 371 (c)(1),
(2) Date: Mar. 25, 2015

(87) PCT Pub. No.: WO2014/048946
PCT Pub. Date: Apr. 3, 2014

(65) Prior Publication Data
US 2015/0264392 A1 Sep. 17, 2015

(30) Foreign Application Priority Data

Sep. 26, 2012 (FR) .................................... 12 59011
Nov. 29, 2012 (FR) .................................... 12 61403

(51) Int. Cl.
*H04N 19/533* (2014.01)
*H04N 19/105* (2014.01)
(Continued)

(52) U.S. Cl.
CPC ........... *H04N 19/533* (2014.11); *H04N 19/105* (2014.11); *H04N 19/154* (2014.11); *H04N 19/176* (2014.11); *H04N 19/573* (2014.11); *H04N 19/577* (2014.11); *H04N 19/61* (2014.11)

(58) Field of Classification Search
CPC . H04N 19/105; H04N 19/154; H04N 19/176; H04N 19/533; H04N 19/573; H04N 19/577; H04N 19/61; H04N 7/34; H04N 7/26244; H04N 7/26015; H04N 7/50; G06T 9/00; G06T 9/004
USPC ............. 382/236, 232, 274, 275; 375/240.14, 375/E07.027
See application file for complete search history.

(56) References Cited

U.S. PATENT DOCUMENTS 5,598,226 A * 1/1997 Kokaram .................. H04N 5/21 348/607
5,737,022 A * 4/1998 Yamaguchi .......... H04N 19/172 375/240.15

(Continued)

FOREIGN PATENT DOCUMENTS

EP 2154901 2/2010
EP 2262270 12/2010

(Continued)

OTHER PUBLICATIONS

Xiaoming Li et al., "Template based illumination compensation algorithm for multiview video coding", Visual Communications and Image Processing 2010, published 2010, pages Proc. of SPIE vol. 7744 774428-1, pp. 8.*

(Continued)

*Primary Examiner* — Mekonen Bekele
(74) *Attorney, Agent, or Firm* — Patricia A. Verlangieri

(57) ABSTRACT

A method and device for predicting a block of pixels of an image for encoding/decoding same. The method comprises a step of defining a causal vicinity of said block to be predicted, a step 2 of searching for candidate patches during which a set of candidate patches is formed from at least one patch belonging to an image other than the image to which the block to be predicted belongs, each patch being formed from a block and from a causal vicinity of said block, and a step 3 of block prediction during which the block is predicted at least from the block of at least one patch of said set of candidate patches.

18 Claims, 5 Drawing Sheets

(51) Int. Cl.
*H04N 19/176* (2014.01)
*H04N 19/154* (2014.01)
*H04N 19/61* (2014.01)
*H04N 19/573* (2014.01)
*H04N 19/577* (2014.01)

(56) References Cited

U.S. PATENT DOCUMENTS

| | | | | |
|---|---|---|---|---|
| 9,031,130 | B2 * | 5/2015 | Suzuki | H04N 19/105 375/240.12 |
| 2010/0208814 | A1 | 8/2010 | Xiong et al. | |
| 2011/0293007 | A1 * | 12/2011 | Abe | H04N 19/00763 375/240.14 |
| 2014/0314330 | A1 * | 10/2014 | Cherigui | G06T 9/00 382/238 |
| 2015/0304656 | A1 * | 10/2015 | Guillemot | H04N 19/105 382/233 |

FOREIGN PATENT DOCUMENTS

| | | |
|---|---|---|
| FR | 2941581 | 7/2010 |
| KR | 101145698 | 5/2012 |
| WO | WO2012033968 | 3/2012 |

OTHER PUBLICATIONS

Safa Cherigui et al., "Map-Aided Locally Linear Embedding Methods for Image Prediction", published in 2010, IEEE, pp. 2909-2912.*

Huang et al:"A weighted low-rank matrix approximation based template matching scheme for inter-frame prediction"; Signals and Electronic Systems (ICSES); 2012 International Conference on, IEEE, Sep. 18, 2012, pp. 1-5.
Turkan et al:"Sparse approximation with adaptive dictionary for image prediction"; Image Processing (ICIP) 2009 16th IEEE International Conference on, IEEE, USA Nov. 7, 2009; pp. 25-28.
Sugimoto et al: "Inter Frame Coding With Template Matching Spatio-Temporal Prediction"; 2004 International Conference on Image Processing (ICIP) (IEEE Cat. No. 04CH37580); pp. 465-468.
Guillemot et al: "Neighbor Embedding With Non-Negative Matrix Factorization for Image Prediction"; Proceedings of the 2012 IEEE International Conference on Acoustics, Speech and Signal Processing (ICASSP 2012); pp. 1-4.
Lucas et al: "TEREO Image Coding Using Dynamic Template-Matching Prediction"IEEE EUROCON 2011—International Conference on Computer as a Tool; pp. 1-4.
Chen et al: "Predictive Patch Matching for Inter-Frame Coding"; Proceedings of the SPIE—The International Society for Optical Engineering vol. 7744 774412; SPIE—The International Society for Optical Engineering; pp. 1-8.
Wiegand et al: "Overview of the H.264 AVC"; Circuits and Systems for Video Technology, IEEE Transactions, vol. 13, No. 7, pp. 560-576 ;Jul. 2003.
Search Report Dated Jan. 13, 2014.

* cited by examiner

_US 9,374,597 B2_

INTER-IMAGE PREDICTION METHOD AND DEVICE AND CORRESPONDING ENCODING METHOD AND DEVICE

This application claims the benefit, under 35 U.S.C. §365 of International Application PCT/EP2013/069903, filed Sep. 25, 2013, which was published in accordance with PCT Article 21(2) on Apr. 3, 2014 in English and which claims the benefit of French patent application No. 1259011, filed Sep. 26, 2012 and French patent application No. 1261403, filed Nov. 29, 2012.

1. FIELD OF THE INVENTION

The invention relates to the general field of image coding and more specifically to that of inter-image prediction.

2. PRIOR ART

Inter-image prediction consists in taking advantage of the temporal redundancies which exist between consecutive images of a video in order to obtain high compression rates for this video.

The principle of inter-image prediction consists in dividing a current image into blocks or macroblocks. Then, the coder finds a similar block in another (previous or future) image of the video. This other image is usually called the reference image. The coder then encodes a motion vector which defines the position of the block found in said reference image(s) from the block to be predicted. The coder then calculates the difference between these two blocks and codes the prediction error. The motion vector and the prediction error are then transmitted to the decoder which can thus reconstruct the block.

A great many video coding/decoding schemas which use this type of method are known. The following can notably be cited, the standards MPEG-2 (ISO/IEC JTC1/SC29/WG11 MPEG00/October 2000, Coding of moving pictures and audio), MPEG-4/AVC (T. Wiegand, G. J. Sullivan, G. Bjontegaard, and A. Luthra, "Overview of the H.264/AVC" Circuits and Systems for Video Technology, IEEE Transactions, Vo 13, 7, 560-576, July 2003, or event HEVC (ITU-T Q.6/SG and ISO/IEC Moving Picture Experts Group (ISO/IEC JTC 1/SC 29/WG 11).

The definition of the blocks (or more generally of the zones) for predicting a block is decisive for the effectiveness of the coding. In fact, if the contents of the current block and the prediction block are very different, the prediction error will be significant which will lead to a significant number of bits for coding this prediction error.

It is therefore necessary to minimise the risks of choosing prediction zones far removed in terms of content from the block to be predicted.

Moreover, in a context of transmission between a transmitter and a receiver, the cost of coding the syntax elements required by the remote decoder to reconstruct a predicted image is relatively high. For example, in the case of the MPEG-4/AVC standard, the reference images are grouped together in two lists: that grouping together (decoded or reconstructed) images temporally previous to an image to which belongs the block to be predicted and that grouping together temporally subsequent (decoded or reconstructed) images. Hereafter, when temporally previous and/or subsequent images are referred to, it is implied that these images are decoded and reconstructed. Thus, to designate a block of a reference image, it is necessary to transmit to a decoder an item of information to designate one of the two lists of images, an item of information to indicate an index of a (reference) image in this list and a last item of information to indicate the coordinates of the block in the reference image.

3. SUMMARY OF THE INVENTION

The purpose of the invention is to overcome at least one of the disadvantages of the prior art and notably to improve the efficiency of the inter-image coding methods.

For this purpose, the invention relates to a method for predicting a block of pixels of an image that comprises:

a step for defining a causal neighbourhood of said block to be predicted, a search step for candidate patches during which a set of candidate patches is formed from at least one patch belonging to an image other than the image to which the block to be predicted belongs, each patch being formed by a block and a neighbourhood that is causal of this block and a block prediction step during which the block is predicted from, at least, the block of at least one patch of said set of candidate patches.

Hence, the method reduced the elements of syntax that it is necessary to transmit to the decoder such as for example the ones related to the standard MPEG-4/AVC.

According to an embodiment, during the block production step, the block is predicted from a block of a patch of said set of candidate patches, said block being close, in terms of content, to the block to be predicted.

According to another embodiment, the block prediction step comprises a dictionary definition sub-step during which at least one dictionary is formed from at least one patch of said set of candidate patches, a neighbourhood prediction sub-step during which, for each dictionary, a prediction of the causal neighbourhood of the block to be predicted is determined using a weighted linear combination of neighbourhoods of patches of the dictionary; weighting parameters which optimise the prediction are chosen, and a block prediction step during which the pixel block of the image is predicted by a weighted linear combination of the pixels of the blocks of the patches of a dictionary, the weighting parameters of said linear combination being those optimums that have been determined during the neighbourhood prediction step.

According to this embodiment, the block prediction is determined by a linear combination of blocks belonging to a dictionary. The weighting parameters of this linear combination are those that enable the best prediction of the causal neighbourhood of the block to be predicted in the sense of a distance. Hence, the prediction error for the block is reduced as the weighting parameters are defined to minimise a prediction error for a zone (neighbourhood) situated around the block to be predicted and not directly a prediction error for this block thus favouring a continuity of the content of the images.

Moreover, as the neighbourhoods are causal, the decoder is able to calculate the weighting parameters used for the prediction of the coder side block. This prevents the transmission of these weighting parameters and thus prevents the coding efficiency The present invention also relates to a coding/decoding method that implements this method as well as a device and an image sequence coding/decoding apparatus that comprises means for implementing the process. It also relates to a signal whose frame is particular as it carries a specific item of information that influences the operation of said device and/or apparatus of coding and/or decoding.

4. LIST OF FIGURES

The invention will be better understood and illustrated by means of non-restrictive embodiments and advantageous implementations, with reference to the accompanying drawings, wherein:

FIG. 1 shows a diagram of the steps of the method for predicting a pixel block of an image according to the present invention;

FIG. 2 gives an example of defining a causal neighbourhood;

Figure 9:
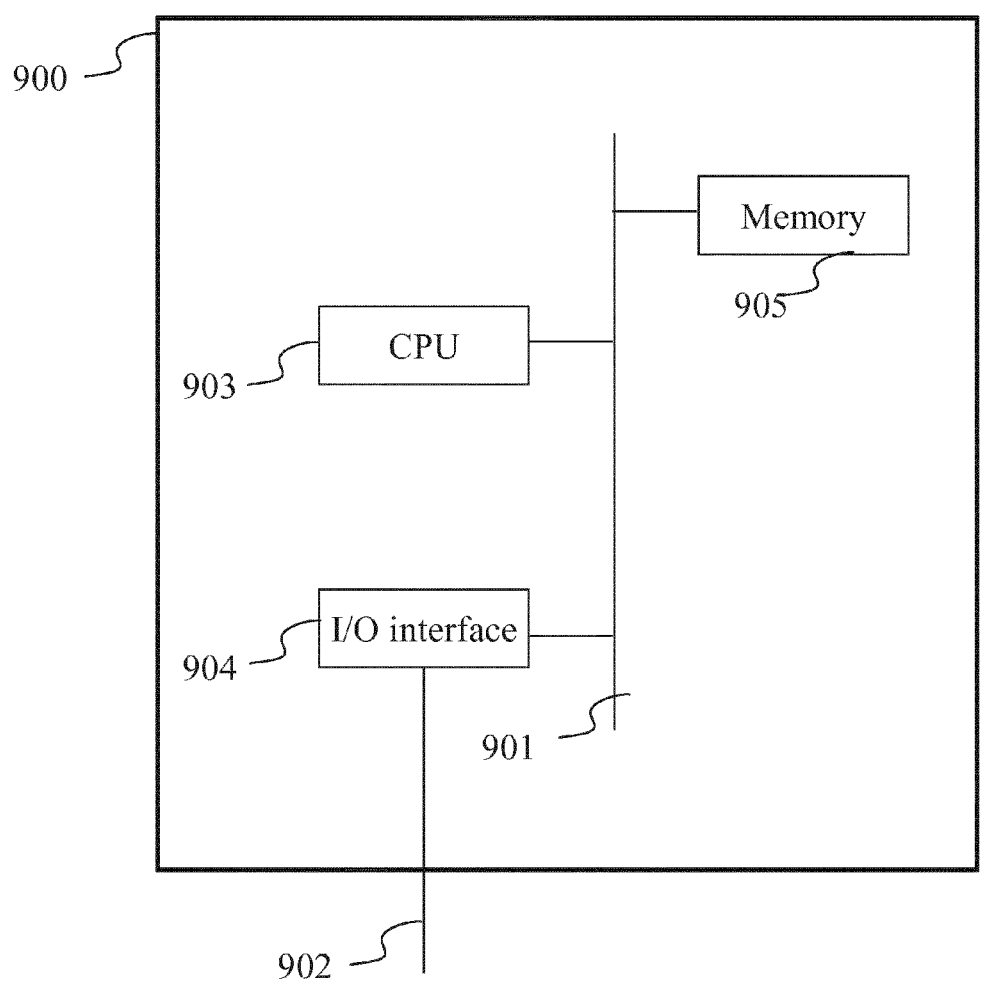

FIG. 9 diagrammatically shows an example of the architecture of a device implementing the invention.

5. DETAILED DESCRIPTION OF THE INVENTION

Figure 1:
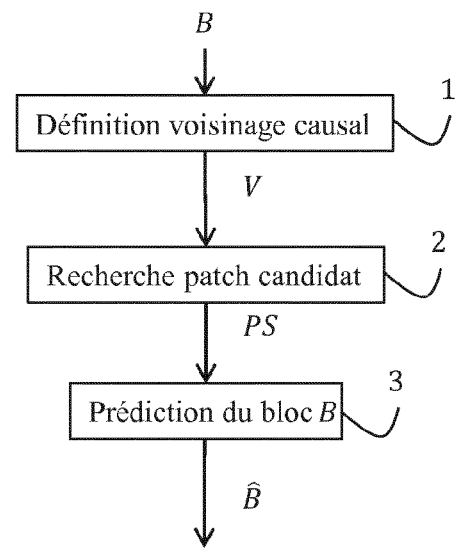

FIG. 1 shows a diagram of the steps of the method for predicting a pixel block of an image according to the present invention;

The method comprises a step 1 for defining a causal neighbourhood V of a block B to be predicted of a current image $I_c$.

Figure 2:
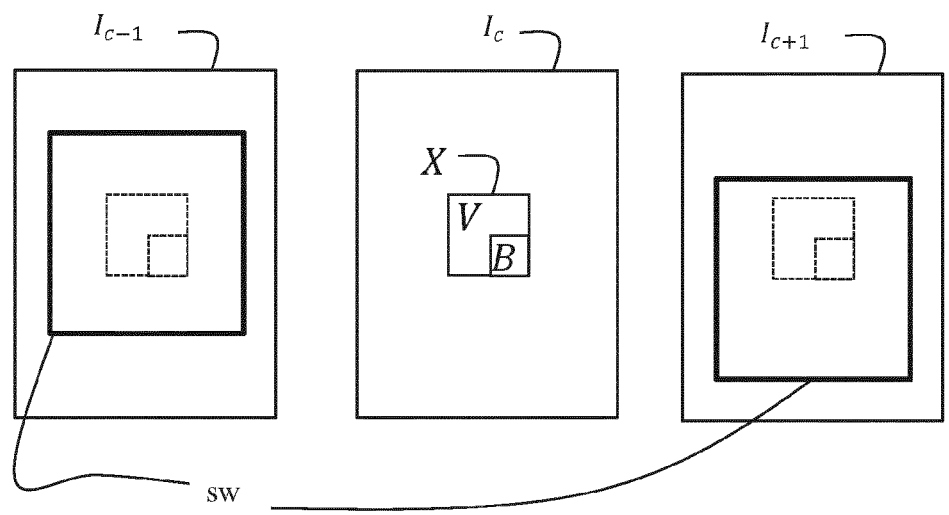

FIG. 2 gives an example of defining a causal neighbourhood. According to this example, the neighbourhood V is formed, for example, from three blocks situated to the left and above the pixel block B to be predicted. A neighbourhood is a vector of N values, each value corresponding to the value of a pixel belonging to this neighbourhood. The invention is in no way limited to this definition of neighbourhood but instead extends to any definition of causal neighbourhood that is to say to any neighbourhood which is available at a decoder prior to decoding the current block to be predicted.

Hereafter, the term patch, denoted $X_k$, will be used to designate a grouping of pixels of a block $B_k$ and pixels of a neighbourhood $V_k$ of this block $B_k$. The neighbourhood $V_k$ is causal of this block $B_k$ and has an identical form to that of the neighbourhood V situated around the block B to be predicted. The causality of a neighbourhood with respect to a pixel block indicates that the pixel values are known prior to the prediction of this block. The patch X is also used hereafter to designate the grouping of pixels of the pixel block to be predicted B and pixels of the neighbourhood V.

Returning to FIG. 1, the method also comprises a search step 2 of candidate patches during which a set of candidate patches PS is formed by at least one patch $X_k$ belonging to an image other than the image to which the block to be predicted belongs. The method comprises, moreover, a block prediction step (3) during which the block B is predicted from, at least, the block of at least one patch of said set PS.

According to an embodiment, each patch $X_k$ of the subset of candidate patches SPS is chosen so that its neighbourhood $V_k$ is close, in terms of content, to the neighbourhood V of patch X.

In mathematical terms, a patch $X_k$ of the set of candidate patches is such that it satisfies equation (1):

$$\min_k \|V - V_k\|_2^2 \quad (1)$$

Hence, the set PS contains the N candidate patches that minimise the Euclidean standard given in the equation (1). Distances other than the Euclidean norm can be used without leaving the scope of the invention.

According to an embodiment, during the search step of candidate patches, for each said other image a predetermined number of candidate patches is considered.

This embodiment is advantageous as by limiting the number of candidate patches by image and the number of images, the calculation complexity of the neighbourhood (and block) prediction step is greatly reduced while preserving the uniformity of the content often present in an image or in consecutive images.

According to a variant, a single candidate patch is thus chosen per image.

According to an embodiment, only the patches which belong to a predetermined zone SW defined over one or more images are considered as candidate patches.

According to a variant, the predetermined zone (or a part of it called sub-zone) is defined around a patch.

Hence, the predetermined zone SW can be defined over a single image in the form of a spatial region but can also have a temporal character that is to say that this predetermined zone SW is defined over several images of an image sequence which may or may not be temporally consecutive.

For example, this zone, referenced SW, is defined on FIG. 2, on the one hand, by a sub-zone of a temporarily previous image $I_{c-1}$ to the image $I_c$ (to which the block to be predicted belongs), said sub-zone being centred around the patch X (of which its co-localised patch is represented on this dotted image) and, on the other hand, by a sub-zone of another image $I_{c+1}$ temporarily posterior to the image $I_c$. Through this example, it can be understood that the predetermined zone SW can be composed of one or more sub-zone(s), each sub-zone can be defined around a co-located patch of this patch X, possibly centred around it, and that these zones can be situated in different images previous and/or subsequent to the image to which belongs the block to be predicted.

Figure 3:
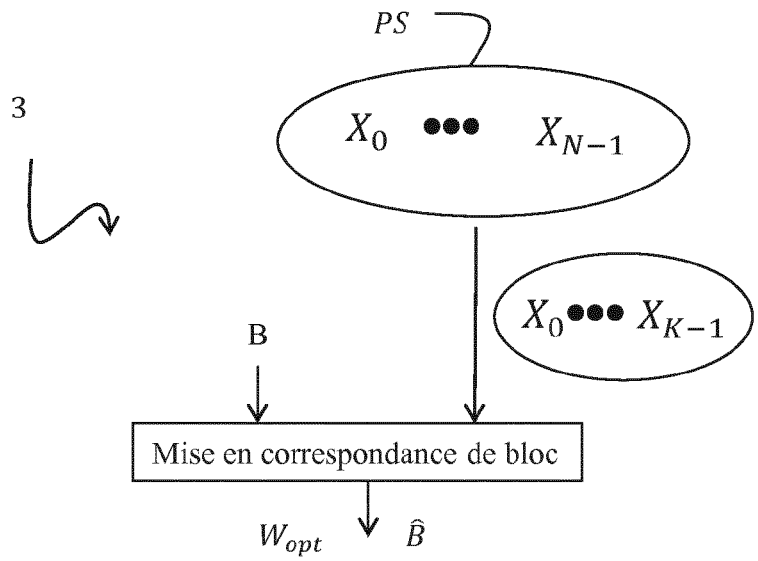
FIG. 3 shows an embodiment of the block prediction step of the method.

According to an embodiment, shown in FIG. 3, during the block prediction step 3, the block B is predicted from a block $B_{opt}$ of a patch of said set of candidate patches, said block being close, in terms of content, to the block to be predicted.

In mathematical terms, this prediction of the block to be predicted B consists in determining a patch of the set PS that minimises a distance between the values of the pixels of the block $B_k$ of this patch and the values of the pixels of the block B (block matching).

This embodiment is particularly advantageous as the cost of coding of the index of the block $B_{opt}$ or the patch to which it belongs in the set PS is reduced in relation to the coding cost of the syntax elements of the standard coding and/or decoding systems.

According to an embodiment, this distance is expressed in Euclidean space by a minimisation, in the sense of least squares, expressed by equation (2):

$$\text{opt} = \text{argmin}_k \|B - B_k\|_2^2 \text{ where } k \in \{0; K-1\} \quad (2)$$

According to this embodiment, an item of information (index) designating the patch to which the prediction block $B_{opt}$ belongs must be known by a remote decoder. Indeed, such a decoder can reconstruct the set of the candidate patches PS and can, from this information, find what is the patch of this set to which this block $B_{opt}$ belongs. For this purpose, a carrier signal of this designation information of this patch is sent to a decoder intended to use this prediction block.

Figure 4:
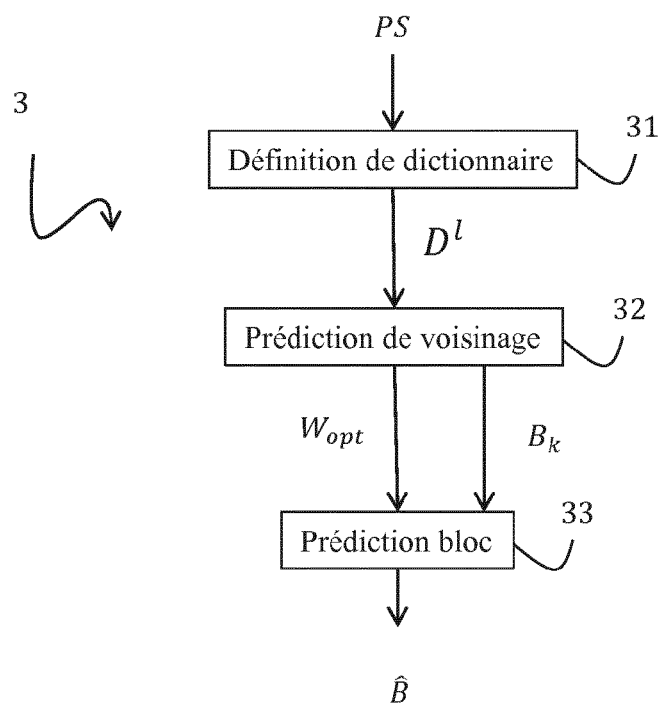
FIG. 4 shows another embodiment of the block prediction step of the method.

According to an embodiment, shown in FIG. 4, the block prediction step 3 comprises a dictionary definition sub-step 31 during which L dictionaries $D^l$ are formed (L is greater than or equal to 1). Each dictionary is formed from at least one patch of the set of candidate patches PS.

The number L of dictionaries and the number of patches per dictionary are values known a priori.

According to a variant, the number K of patches in each dictionary is common to all dictionaries.

According to a variant, the number K is variable according to the block to be predicted.

In this case, this number K can be optimised for each block to be predicted. It is then necessary, in a context of transmission between transmitter/receiver, to transmit this number to the receiver for each block to be predicted.

A dictionary can contain patches chosen randomly from among the ones of the candidate patch set PS.

The block prediction step also comprises a neighbourhood prediction sub-step 32. During this sub-step, for each dictionary $D^l$ a prediction of the causal neighbourhood V of the block to be predicted B is determined using a weighted linear combination of neighbourhoods $V_k$ of patches $X_k$ of this dictionary; weighting parameters which optimise the prediction are chosen.

In mathematical terms, the prediction of the causal neighbourhood V of the block to be predicted B using a weighted linear combination of neighbourhoods $V_k$ of patches $X_k$ of a dictionary $D^l$ consists in determining weighting parameters $W_m$ where $m \in \{0;K-1\}$ which minimise a distance between the weighted values of pixels of neighbourhoods $V_k$ of patches of this dictionary $D^l$ and the values of pixels of neighbourhood V.

According to an embodiment, this distance is expressed in Euclidean space by a minimisation, in the sense of least squares, expressed by equation (3):

$$\text{opt} = \text{argmin}_m \|V - A^l W_m^l\|_2^2 \text{ under the constraint } \Sigma_m W_m^l = 1 \quad (3)$$

where $A^l$ is a matrix of dimension M×K which groups together the values of the pixels of K neighbourhoods $V_k$ of patches of dictionary $D^l$, the M pixel values of each neighbourhood are grouped together to form a column of this matrix.

K weighting parameters are thus optimised, in practice by equation (4):

$$W_{opt}^l = \frac{CO_l^{-1} * I}{I^T * CO_l^{-1} * I} \quad (4)$$

where $CO_l$ is a local covariance matrix (with reference to neighbourhood V) of values of pixels of matrix $A^l$ and I is a unit column vector.

The K optimal weighting parameters $W_{opt}^l$ are therefore obtained to predict neighbourhood V using a linear combination of K neighbourhoods $V_k$ of dictionary $D^l$.

According to an embodiment, during the neighbourhood prediction step, L dictionaries $D_l$ avec $l \in \{0;L-1\}$ having been considered and weighting parameters $W_{opt}^l$ having been determined for each of these dictionaries, the weighting parameters W used to predict block B are those which provide the closest prediction, in the sense of a criterion, to said block to be predicted.

According to an embodiment, this criterion is a square error between the reconstructed predicted block (after coding and decoding) and the block to be predicted.

In mathematical terms, the optimal weighting parameters W are then those given by equation (5):

$$\min_l \|B - A^l W_{opt}^l\|_2^2 \text{ under the constraint } \Sigma_m W_{opt}^l = 1 \quad (5)$$

According to another embodiment, the criterion used is a rate-distortion criterion particularly suitable for the context of video compression.

In mathematical terms, the optimal weighting parameters W are then those given by equation (6):

$$\min_l (SSE^l + \lambda R^l) \quad (6)$$

where $SSE^l$ is a measure in the sense of least squares of the reconstruction error between the block to be predicted and the reconstructed predicted block (decoded block), $R^l$ is the cost of coding the block (prediction error and other syntax elements), and $\lambda$ is the Lagrangian.

Moreover, the block prediction step comprises a block prediction sub-step 33 during which the block B is predicted by a weighted linear combination of the pixels of the blocks $B_k$ of the patches $X_k$ of the dictionary $D^l$, the weighting parameters (W if several dictionaries are formed or $W_{opt}^l$ in the case of a single dictionary) being those that were determined during the prediction step of the causal neighbourhood of the block to be predicted.

In mathematical terms, the prediction $\hat{B}$ of block B is given by equation (7):

$$\hat{B} = A * W \quad (7)$$

where A is a matrix of dimension P×K which groups together the P values of the pixels of the K blocks $B_k$, and W are the weighting parameters.

In a context of transmission between a transmitter and a receiver, no specific information is to be transmitted to the receiver (decoder) to predict block B in the case where the number of parameters to be used is previously known by the decoder and in the case of a single dictionary constructed solely on the basis of neighbourhood. In fact, the prediction method can be implemented by the receiver without specific information as, on one hand, the neighbourhoods used by the prediction are causal, which enables the receiver to find the blocks of the patches to reconstruct matrix A and, on the other hand, by implementing the prediction of neighbourhood V; the K weighting parameters obtained in this case are identical to those (W) obtained during the sub-step of predicting the neighbourhood implemented in this case by the transmitter (coder).

It can thus be understood that a coding method implementing this prediction method provides significant coding gains compared with traditional techniques of inter-image coding such as those used for example in H.264/AVC.

According to a variant of this embodiment that corresponds to the case of several dictionaries, a specific item of information that identifies the dictionary used must be known by a decoder to reconstruct the block to be predicted. For this purpose, a signal carrying a specific item of information which identifies the dictionary from which originates the prediction of the block to be predicted. This signal is designed to be received by a decoder configured to use this dictionary.

Figure 5:
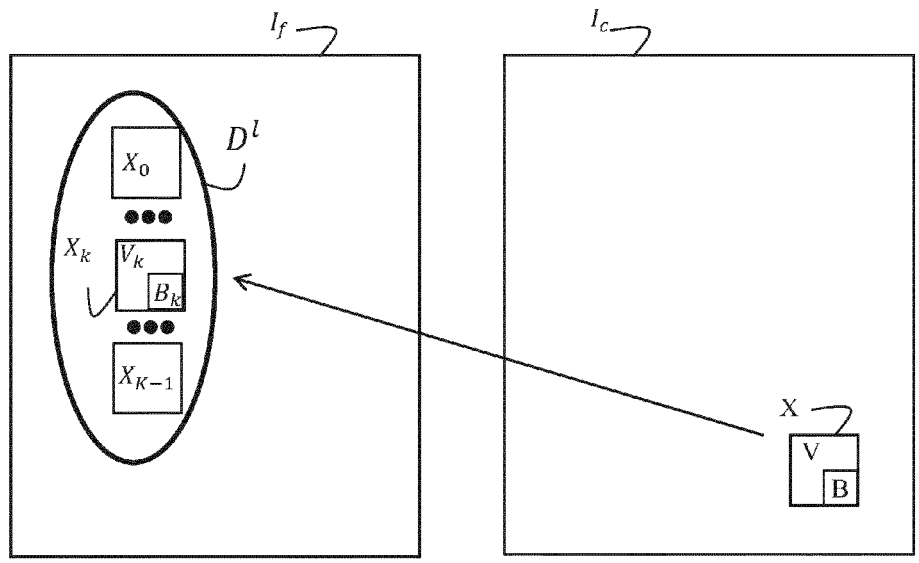
FIG. 5 shows the case where the patches of a dictionary belong to a same image.

According to an embodiment, shown by FIG. 5, the K patches $X_k$ where $k \in \{0;K-1\}$ of a dictionary $D^l$ are all situated in a same image $I_f$ other than current image $I_c$. Image $I_f$ can be temporally previous or subsequent to image $I_c$ when these two images belong to a same image sequence.

Figure 6:
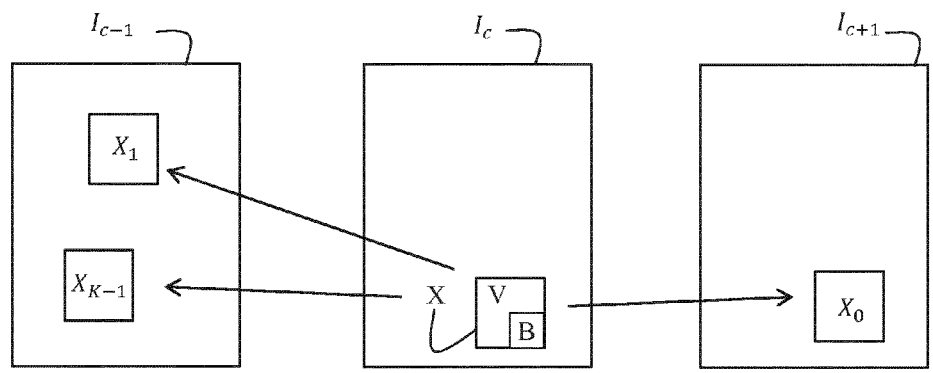
FIG. 6 shows the case where the patches of a dictionary do not all belong to a same image.

According to an embodiment, shown by FIG. 6, the K patches $X_k$ where $k \in \{0;K-1\}$ of a dictionary $D^l$ are situated in different images. According to the example of FIG. 6, dictionary $D^l$ comprises (K-1) patches $X_1, \ldots, X_{K-1}$ in an image $I_{c-1}$ temporally previous to current image $I_c$ and a patch $X_0$ in an image $I_{c+1}$ temporally subsequent to current image $I_c$.

This embodiment is advantageous as it makes it possible to increase the possibilities of patches in a same dictionary which can thus belong to different images. This makes it possible to decrease further the prediction error for the block to be predicted as the method then benefits from temporal redundancies between images of a same video.

These two embodiments, shown by FIGS. 5 and 6, in no way limit the definition of a dictionary. They have been given to show that a dictionary can be formed by patches situated in one or more images other than that to which belongs the block to be predicted.

According to an embodiment, during the dictionary definition step, it is determined, for each dictionary $D^l$ to define, on the one hand a first patch $X_0$ among the patches of the set PS, said first patch is close, in terms of content, to patch X and, on the other hand, (K-1) patches $X_k$ among the patches of the set PS, each one of them being close, in terms of content, to this first patch $X_0$. The dictionary $D^l$ thus contains the first patch $X_0$ and the (K-1) patches $X_k$.

The proximity of the contents of two patches is quantified by a distance calculated between the values of the pixels of the patches. This distance is, for example, the sum of the absolute distances between the pixels of these two patches.

According to an embodiment, the predetermined zone SW is defined by at least one sub-zone that is located around a first patch. It can, for example, be centred around this first patch.

This variant is advantageous as it greatly limits the calculation complexity of the neighbourhood prediction step while preserving the uniformity of the content often present in an image.

According to an embodiment, the position of a first patch $X_0$ of a dictionary $D^l$ in an image (other than the image to which the block to be predicted belongs) is given by an item of displacement information $\vec{d_l}$ defined from the patch X.

The displacement information $\vec{d_l}$ can, according to an embodiment, be obtained by a block matching method that can determine a displacement of each first patch in relation to the patch X. This block matching method is similar to the one described in relation to FIG. 3 by considering that the blocks are formed from all the pixels of the patches and no longer only the pixels of the blocks of these patches as this is described in the embodiment of block prediction step 3.

Within the context of transmission between transmitter and decoder, the item of displacement information must be transmitted to the decoder in order that this decoder can determine which was the first patch used. It is not necessary to transmit other information to determine the other (K-1) patches of the dictionary as the decoder is able to determine them by implementing similar operations to those described above.

Figure 7:
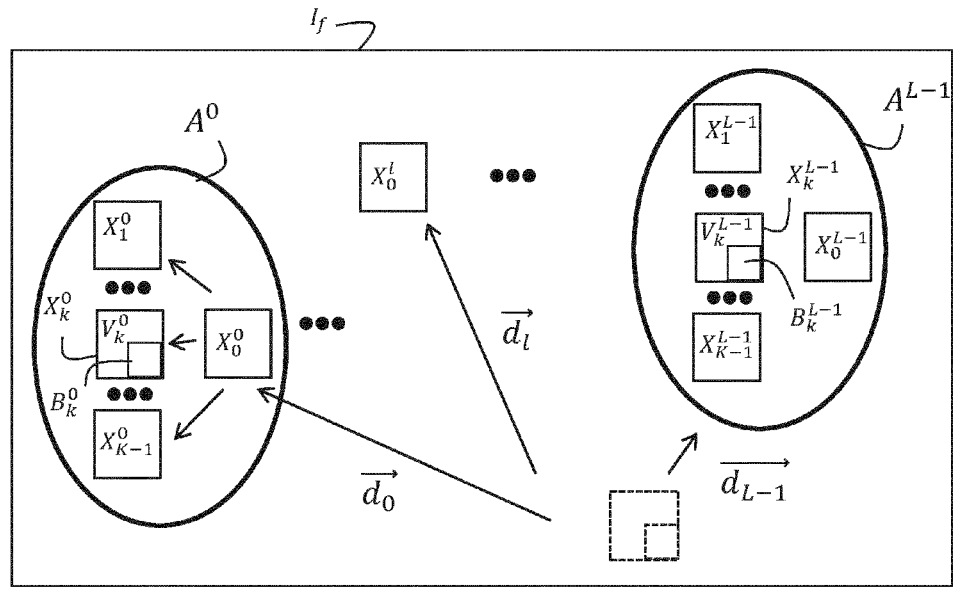
FIG. 7 shows the case where dictionaries are defined from first patch.

FIG. 7 shows the case where L dictionaries have been defined, each from a first patch. It can thus be seen that each of the L first patches $X_0^l$ where $l \in \{0;L-1\}$ are obtained from the displacement of patch X (or more precisely, virtually from its co-located patch X' in image $I_f$).

Each displacement is expressed in the form of a vector $\vec{d_l}$.

Figure 8:
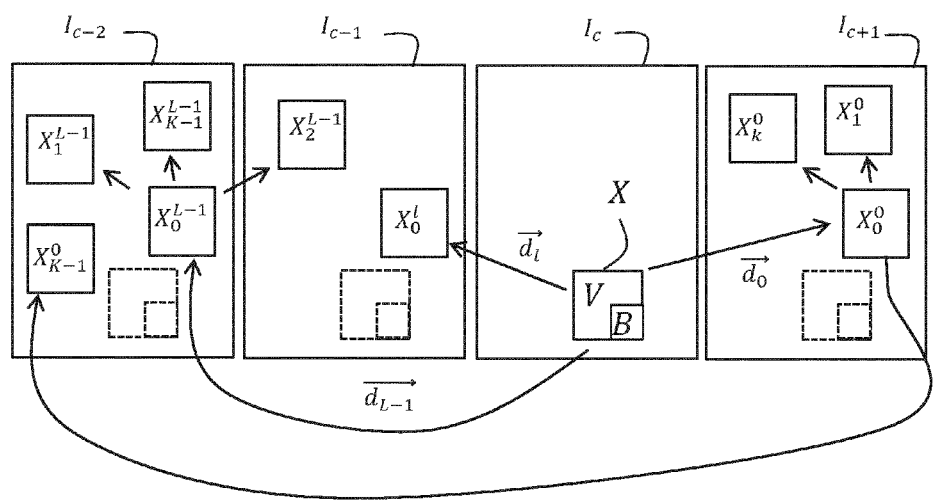
FIG. 8 shows the case where patches of a dictionary do not all belong to a same image.

FIG. 8 shows the case where dictionary patches do not all belong to the same image $I_f$. It can be noted that an image $I_{c+1}$ does not temporally precede current image $I_c$ during decoding of this current image. According to this example, dictionary $D_0$ is formed from a first patch $X_0^0$ belonging to image $I_{+1}$ and patches which do not all belong to image $I_{c+1}$. For example, a patch $X_{K-1}^0$ belongs to image $I_{c-2}$. Likewise, dictionary $D_{L-1}$ is formed from a first patch $X_0^{L-1}$ belonging to image $I_{c-2}$ and patches which do not all belong to image $I_{c-2}$. For example, a patch $X_2^{L-1}$ belongs to image $I_{c-1}$.

Through these examples, it can be understood that the distance which quantifies the proximity of the contents of two patches is to be understood in the widest sense as it can be defined to quantify the resemblance between patches which do not necessarily belong to a same image.

FIG. 9 shows an example of the architecture of a device comprising means configured to implement the invention described in relation to FIGS. 1 to 8.

Device 900 comprises the following elements, interconnected by a digital address and data bus 901:
A calculation unit 903 (also called a central processing unit);
A memory 905;
A network interface 904, for interconnections between device 900 and other remote devices connected via a connection 902;

The calculation unit 903 can be implemented by a (possibly dedicated) microprocessor, a (possibly also dedicated) microcontroller, etc. The memory 905 can be implemented in a volatile and/or non-volatile form such as a RAM (random access memory), a hard disc, an EPROM (erasable programmable ROM), etc.

The means 903, 905 and possibly 904 cooperate with each other to define a causal neighbourhood of a block to be predicted, to search for a set of candidate patches that is formed from at least one patch belonging to an image other than the image to which the block to be predicted belongs, each patch being formed by a block and a neighbourhood that is causal of this block.

The means 903, 905 and possibly 904 cooperate with each other to predict a block from, at least, the block of at least one patch of said set of candidate patches.

The means of the device are configured, according to an embodiment, to implement a method described in relation to FIGS. 1 to 8.

According to an embodiment of the device 900, the means 904 are configured to send and/or receive a signal whose frame is particular. Indeed, in the case where the means for predicting of the device 900 are configured to implement a neighbourhood prediction step as described in relation to FIG. 3, the frame of this signal carries an item of information that designates the patch to which belongs the prediction block of the block to be predicted and, according to a variant that corresponds to the case where the means for predicting are configured to implement a neighbourhood prediction step as described in relation to FIG. 4, the frame of this signal carries a specific item of information that identifies the dictionary from which originates the prediction of the block to be predicted. According to another variant, that corresponds to the case where the means for predicting are configured to implement a dictionary definition sub-step during which a dictionary is formed, among other things, from a first patch, the frame of this signal carries an item of displacement information relative to the position of this first patch in an image, said displacement information being defined from the patch formed from the block to be predicted and from its neighbourhood.

The invention also relates to a method for coding and/or decoding an image sequence during which a prediction block is calculated from a reference image image block. The method is characterised in that the prediction block is calculated according to a method described in relation to FIGS. 1 to 8.

The invention also relates to an apparatus for coding and/or decoding an image sequence which is characterised in that it comprises a device described in relation to FIG. 9.

In FIG. 9, the modules shown are functional units that may or may not correspond to physically distinguishable units. For example, these modules or some of them can be grouped together in a single component or circuit, or constitute functions of the same software. On the contrary, some modules may be composed of separate physical entities. The inter-image prediction devices compatible with the invention are implemented according to a purely hardware embodiment, for example in the form of a dedicated component (for example in an ASIC (application specific integrated circuit) or FPGA (field-programmable gate array) or VLSI (very large scale integration) or of several electronic components integrated into a device or even in the form of a mixture of hardware elements and software elements.

The invention claimed is:

1. Prediction method of a pixel block of an image that comprises
a search step for candidate patches during which a set of candidate patches is formed from at least one patch belonging to an image other than the image to which the block to be predicted belongs, each patch being formed by a block and a neighbourhood that is causal of this block and
a block prediction step comprising
a dictionary definition sub-step during which it is determined, for each dictionary,
a first patch among the patches of said set of candidate patches, said first patch being close, in terms of content, to the patch formed from the block to be predicted and from its neighbourhood, and
other patches of said set of candidate patches, each one of them being close, in terms of content, to this first patch,
the dictionary thus containing said first patch and said other patches;
a neighbourhood prediction sub-step during which, for each dictionary, a prediction of the causal neighbourhood of the block to be predicted is determined using a weighted linear combination of neighbourhoods of patches of the dictionary; weighting parameters which optimise the prediction are chosen, and
a block prediction sub-step during which the pixel block of the image is predicted by a weighted linear combination of the pixels of the blocks of the patches of a dictionary, the weighting parameters of said linear combination being those optimums that have been determined during the neighbourhood prediction step.

2. Method according to claim 1, wherein each patch of said set of candidate patches is such that its neighbourhood is close, in terms of content, to the neighbourhood of the patch comprising the block to predict.

3. Method according to claim 1, wherein during the search step of candidate patches, for each said other image is considered a predetermined number of candidate patches.

4. Method according to claim 1, wherein only the patches which belong to a predetermined zone defined over one or more images are considered as candidate patches.

5. Method according to claim 4, wherein said predetermined zone is defined by at least one sub-zone that is located around a first patch.

6. Method according to claim 1, wherein the position of the first patch of a dictionary in an image is given by an item of displacement information defined from the patch formed from the block to be predicted and its neighbourhood.

7. Method according to claim 1, wherein during the neighbourhood prediction step, several dictionaries having been considered and weighting parameters having been determined for each of these dictionaries, the weighting parameters used to predict the block are those which provide the closest prediction, in the sense of a criterion, to said block to be predicted, the dictionary from which originates said prediction is thus identified by a specific item of information.

8. Method for coding and/or decoding an image sequence during which a prediction block is calculated from a reference image image block, wherein the prediction block is calculated according to a method in accordance with claim 1.

9. Device for predicting a pixel block of an image that comprises a processor configured for:
searching for candidate patches during which a set of candidate patches is formed from at least one patch belonging to an image other than the image to which the block to be predicted belongs, each patch being formed by a block and a neighbourhood that is causal of this block and
to predict a block;
wherein the processor is configured to predict a block by:
a dictionary definition sub-step during which it is determined, for each dictionary,
a first patch among the patches of said set of candidate patches, said first patch being close, in terms of content, to the patch formed from the block to be predicted and from its neighbourhood, and
other patches of said set of candidate patches, each one of them being close, in terms of content, to this first patch,
the dictionary thus containing said first patch and said other patches;
a neighbourhood prediction sub-step during which, for each dictionary, a prediction of the causal neighbourhood of the block to be predicted is determined using a weighted linear combination of neighbourhoods of patches of the dictionary; weighting parameters which optimise the prediction are chosen, and
a block prediction sub-step during which the pixel block of the image is predicted by a weighted linear combination of the pixels of the blocks of the patches of a dictionary, the weighting parameters of said linear combination being those optimums that have been determined during the neighbourhood prediction step.

10. Device according to claim 9, wherein the processor is also configured so that each patch of said set of candidate patches is such that its neighbourhood is close, in terms of content, to the neighbourhood of the patch comprising the block to predict.

11. Device according to claim 9, wherein the processor is also configured so that during the search step of candidate patches, for each said other image is considered a predetermined number of candidate patches.

12. Device according to claim 9, wherein only the patches which belong to a predetermined zone defined over one or more images are considered as candidate patches.

13. Device according to claim 12, wherein said predetermined zone is defined by at least one sub-zone that is located around a first patch.

14. Device according to claim 9, wherein the position of the first patch of a dictionary in an image is given by an item of displacement information defined from the patch formed from the block to be predicted and its neighbourhood.

15. Device according to claim 9, wherein during the neighbourhood prediction step, several dictionaries having been considered and weighting parameters having been determined for each of these dictionaries, the weighting parameters used to predict the block are those which provide the closest prediction, in the sense of a criterion, to said block to be predicted, the dictionary from which originates said prediction is thus identified by a specific item of information.

16. Device for coding and/or decoding an image sequence during which a prediction block is calculated from a reference image image block, wherein the prediction block is calculated according to a method in accordance with claim 1.

17. Signal intended to be transmitted or received by a device according to claim 9, wherein it carries an item of displacement information relative to the position of a first patch of a dictionary in an image, said displacement information being defined from the patch formed from the block to be predicted and from its neighbourhood.

18. Apparatus for coding and/or decoding an image sequence which is wherein it comprises a device in accordance with claim 9.

\* \* \* \* \*